US009575550B1

(12) United States Patent
Oiler et al.

(10) Patent No.: US 9,575,550 B1
(45) Date of Patent: Feb. 21, 2017

(54) METHOD FOR COORDINATING OPERATION OF AN OFF-GRID, HYBRID POWER SYSTEM AND AN INFORMATION TECHNOLOGY SYSTEM

(71) Applicant: SPAWAR Systems Center Pacific, San Diego, CA (US)

(72) Inventors: Jonathon Keith Oiler, San Diego, CA (US); Andrew Michael Higier, San Diego, CA (US); Daniel Carl Grady, La Jolla, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 27 days.

(21) Appl. No.: 14/857,356

(22) Filed: Sep. 17, 2015

(51) Int. Cl.
*G06F 1/00* (2006.01)
*G06F 1/32* (2006.01)
*H02J 7/00* (2006.01)

(52) U.S. Cl.
CPC .............. *G06F 1/329* (2013.01); *G06F 1/3228* (2013.01); *H02J 7/007* (2013.01)

(58) Field of Classification Search
None
See application file for complete search history.

(56) References Cited

U.S. PATENT DOCUMENTS

| 7,373,268 B1* | 5/2008 | Viredaz ................. G06F 1/3203 702/130 |
| 7,962,769 B1* | 6/2011 | Patel ....................... G06F 1/206 307/25 |
| 2011/0077795 A1* | 3/2011 | VanGilder ............... G06F 1/206 700/300 |
| 2011/0115291 A1* | 5/2011 | Bradford .................. H02J 1/14 307/23 |

(Continued)

OTHER PUBLICATIONS

Wies, R., Johnson, R., Agrawal, A., Chubb, T., "Simulink model for economic analysis and environmental impacts of a PV with diesel-battery system for remote villages," IEEE Transactions on Power Systems, vol. 20, 2005.

(Continued)

*Primary Examiner* — Nitin Patel
(74) *Attorney, Agent, or Firm* — SPAWAR Systems Center Pacific; Kyle Eppele; J. Eric Anderson

(57) ABSTRACT

A method for coordinating operation of an off-grid, hybrid power system and an information technology (IT) system comprising the following steps: powering the IT system with the off-grid, hybrid power system according to a power generation management scheme designed to maximize fuel savings, wherein the hybrid power system comprises a generator and an electrical energy storage source; monitoring tasks performed by the IT system with a processor; determining which component of the hybrid power system is currently powering the IT system; and dynamically changing the tasks performed by the IT system depending on (Continued)

which component of the hybrid power system is currently powering the IT system such that the IT system only performs high priority tasks when the energy storage source is powering the IT system and such that a queue of low priority tasks are held in abeyance until the generator is powering the IT system.

18 Claims, 8 Drawing Sheets

(56) References Cited

U.S. PATENT DOCUMENTS

2013/0212410 A1* 8/2013 Li .......................... G06F 1/263
713/300

OTHER PUBLICATIONS

Chaudhry, M., Ling, T., Manzoor, A., "Considering thermal-aware proactive and reactive scheduling and cooling for Green Datacenters," International Conference on Advanced Computer Science Applications and Technologies, 2012.
Kaplan, F., Meng, J., Coksun, A., "Optimizing communication and cooling costs in HPC data centers via intelligent job allocation," International Green Computing Conference, 2013.
Windy Dankoff, "Recharging Batteries with a Gas Generator", accessed online at http://www.ibiblio.org/london/alternative-energy/homepower-magazine/archives/3/03pg32 on Aug. 10, 2015.
Arctic Energy Alliance, Guide to Best Practices for Remote Facilities, Jul. 2011.

* cited by examiner

METHOD FOR COORDINATING OPERATION OF AN OFF-GRID, HYBRID POWER SYSTEM AND AN INFORMATION TECHNOLOGY SYSTEM

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 103510.

BACKGROUND OF THE INVENTION

Off-grid information technology (IT) systems are typically powered via a diesel (or other petroleum fuel) generator. Typically, generators in such circumstances are oversized and operate at less than 20% maximum load capacity in order to ensure power availability and no loss in IT services. The invention claimed herein relates to the field of power management of off-grid IT systems.

SUMMARY

The invention disclosed herein is a method for coordinating operation of an off-grid, hybrid power system and an information technology (IT) system comprising the following steps. The first step provides for powering the IT system with the off-grid, hybrid power system according to a power generation management scheme designed to maximize fuel savings. The hybrid power system comprises a generator and an electrical energy storage source. The next step provides for monitoring tasks performed by the IT system with a processor. The next step provides for determining which component of the hybrid power system is currently powering the IT system. The next step provides for dynamically changing the tasks performed by the IT system depending on which component of the hybrid power system is currently powering the IT system such that the IT system only performs high priority tasks when the energy storage source is powering the IT system and such that a queue of low priority tasks are held in abeyance until the generator is powering the IT system.

The invention disclosed herein may also be described as a method for coordinating operation of an off-grid, hybrid power system and an information technology (IT) system comprising the following steps. The first step provides for identifying tasks performed by the IT system as either low priority tasks or high priority tasks with a processor. The next step provides for powering the IT system with the off-grid, hybrid power system which comprises a generator and an energy storage source, wherein the generator is turned on only if one or more of the following conditions exist:
- ambient air temperature surrounding the IT system reaches a highest safe operating temperature of the IT system,
- a level of stored energy in the energy storage source reaches a lower threshold value, and
- a queue of low priority tasks exceeds a first queue-size threshold.

The next step provides for driving the ambient air temperature surrounding the IT system down with an air conditioner as fast as the air conditioner will allow while the generator is running. The next step provides for charging the energy storage source while the generator is running. The next step provides for performing the low priority tasks in addition to the high priority tasks while the generator is running. The next step provides for performing only high priority tasks and holding in abeyance low priority tasks while the generator is not running. The next step provides for turning off the generator and powering the IT system with energy-storage-source power if the generator is running and if all of the following conditions are satisfied:
- the ambient air temperature is less than or equal to a lower threshold temperature,
- the energy storage source has reached a desired energy storage capacity, and
- the queue of low priority tasks is below a second queue-size threshold.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
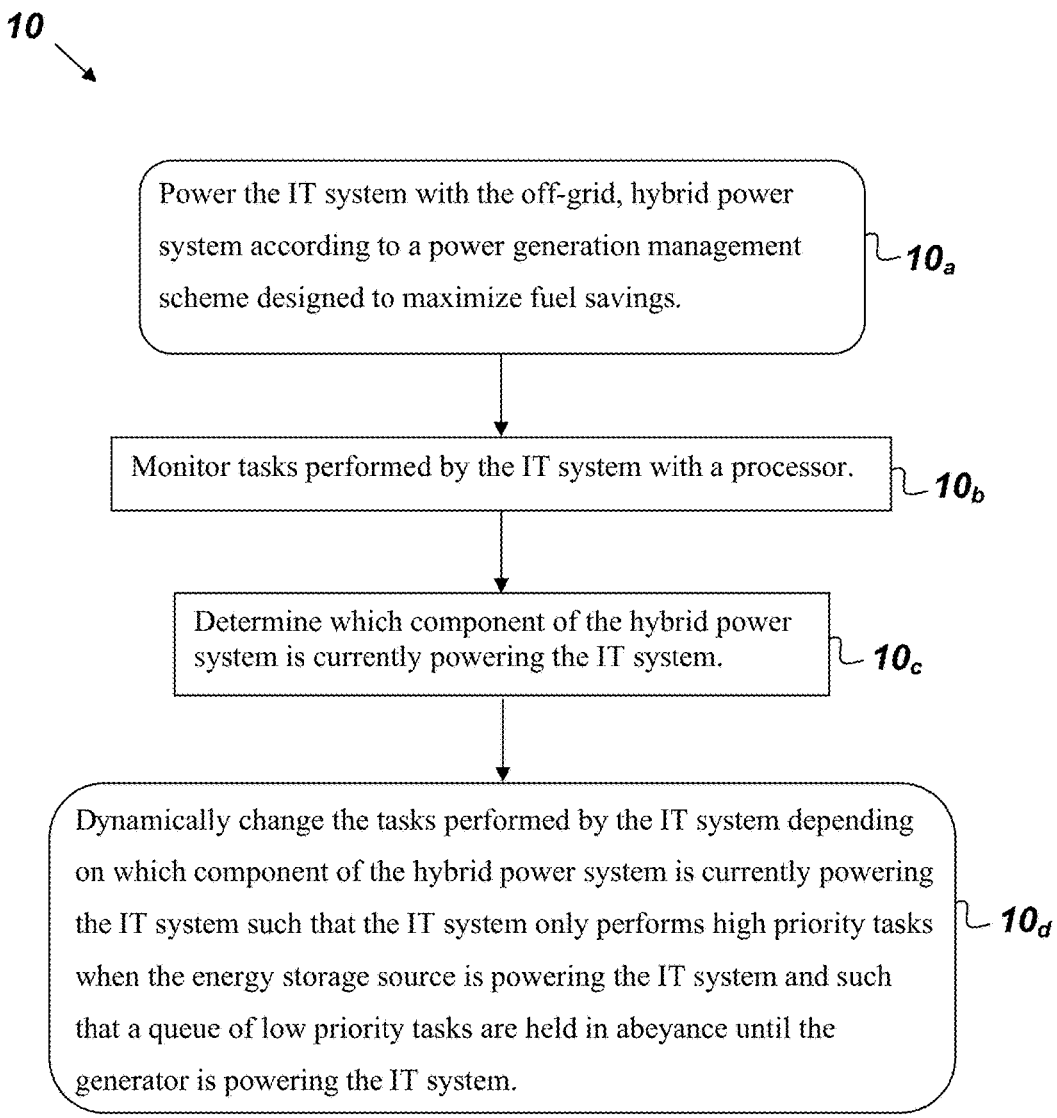
FIG. 1 is a flowchart of a method for coordinating operation of an off-grid, hybrid power system and an information technology (IT) system.

FIG. 1 is a flowchart of a method 10 for coordinating operation of an off-grid, hybrid power system and an information technology (IT) system that comprises, consists of, or consists essentially of the following steps. Off-grid IT systems are IT systems that are not connected to an electrical power grid. The first step $10_a$ provides for powering the IT system with the off-grid, hybrid power system according to a power generation management scheme designed to maximize fuel savings. The hybrid power system comprises at least an electrical energy generator and an electrical energy storage source. The next step $10_b$ provides for monitoring tasks performed by the IT system with a processor. The next step $10_c$ provides for determining which component of the hybrid power system is currently powering the IT system. The next step $10_d$ provides for dynamically changing the tasks performed by the IT system depending on which component of the hybrid power system is currently powering the IT system such that the IT system only performs high priority tasks when the energy storage source is powering the IT system and such that a queue of low priority tasks are held in abeyance until the generator is powering the IT system. In other words, the IT system coordination method 10 alters the tasks performed by the IT system depending on which component of the power system is currently powering the IT system.

Figure 2:
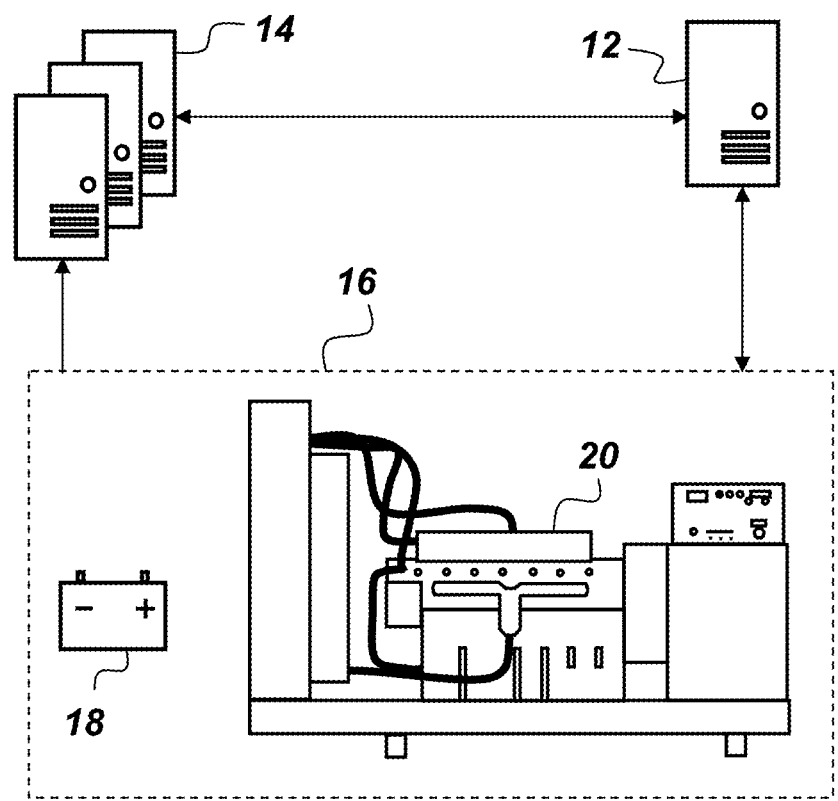
FIG. 2 is an illustration of an IT system, a processor, and a power source.

FIG. 2 is an illustration of a processor 12 that is coordinating operation of an IT system 14 and an off-grid, hybrid power system 16 according to the steps of the IT system coordination method 10. The embodiment of the power system 16 depicted in FIG. 2 comprises an electrical energy storage source 18 and a generator 20. The power system 16 may comprise any petroleum-fueled generator and any electrical energy storage source. The power system 16 may additionally comprise additional energy storage and/or generation sources such as, but not limited to, battery banks, fuel cells, photovoltaic cells, wind turbines, capacitor banks, compressed hydrogen gas storage, compressed air storage, thermal storage. In FIG. 2, the energy storage source 18 is depicted as a battery, but it is to be understood that the energy storage source 18 may be any source of stored electrical energy capable of being replenished by the generator 20 and is not limited to batteries.

An example of an off-grid IT system is a military expeditionary operation. One of the two largest energy consumers for off-grid expeditionary operations is communications, command and control, computers, and intelligence (C4I). Within C4I, IT is a critical component. Incorporating an energy storage source in the power system allows the generator to operate at higher loads and thus higher efficiency. Fuel savings can be realized through a control system that turns off the generator and powers the IT system via the energy storage source at the desired times. Typical expeditionary IT systems include server and power conditioning equipment housed within a tent, cooled by a large air conditioning (A/C) unit. Expeditionary IT systems are also typically oversized for the given C4I needs, and are always on. The IT system coordination method 10 results in energy savings through control strategies involving prioritizing tasks or jobs performed by the IT system. Additionally, the IT system coordination method 10 allows for moving around specific jobs to different servers via 'virtualization' and allows for minimizing energy consumption through control techniques using IT equipment at higher efficiency and turning other IT equipment off when possible.

When power is provided to the IT system by the hybrid power system, the power generation management scheme can be designed to consider feedback from the IT system, the generator, the energy storage source, the A/C system, etc. The power generation management scheme may is geared toward more than specific systems (e.g. minimizing power consumed by the IT equipment or minimizing power consumed by the cooling equipment). The power generation management scheme is a systems-level control scheme due to the incorporation of a hybrid energy storage source (e.g., battery) into the power system along with the generator as well as the ability to control various components of the IT system in conjunction with the hybrid power system. A power system can be managed to provide fuel savings by replenishing the energy storage source (e.g., recharging a battery bank) during generator operation, which in turn allows the generator to operate at a higher load and thus higher efficiency.

Once the energy storage source has been replenished to a desired level, the generator can be turned off and the energy storage source used to supply the power to the various components of the IT system. Alternatively, a smaller generator can be chosen and energy storage can be used at times when the load is greater than the capacity of the generator. Because the generator is operating at a higher fuel-efficiency while replenishing the energy storage source, fuel-savings are realized when the energy storage source is used to power the IT system.

Figure 3A:
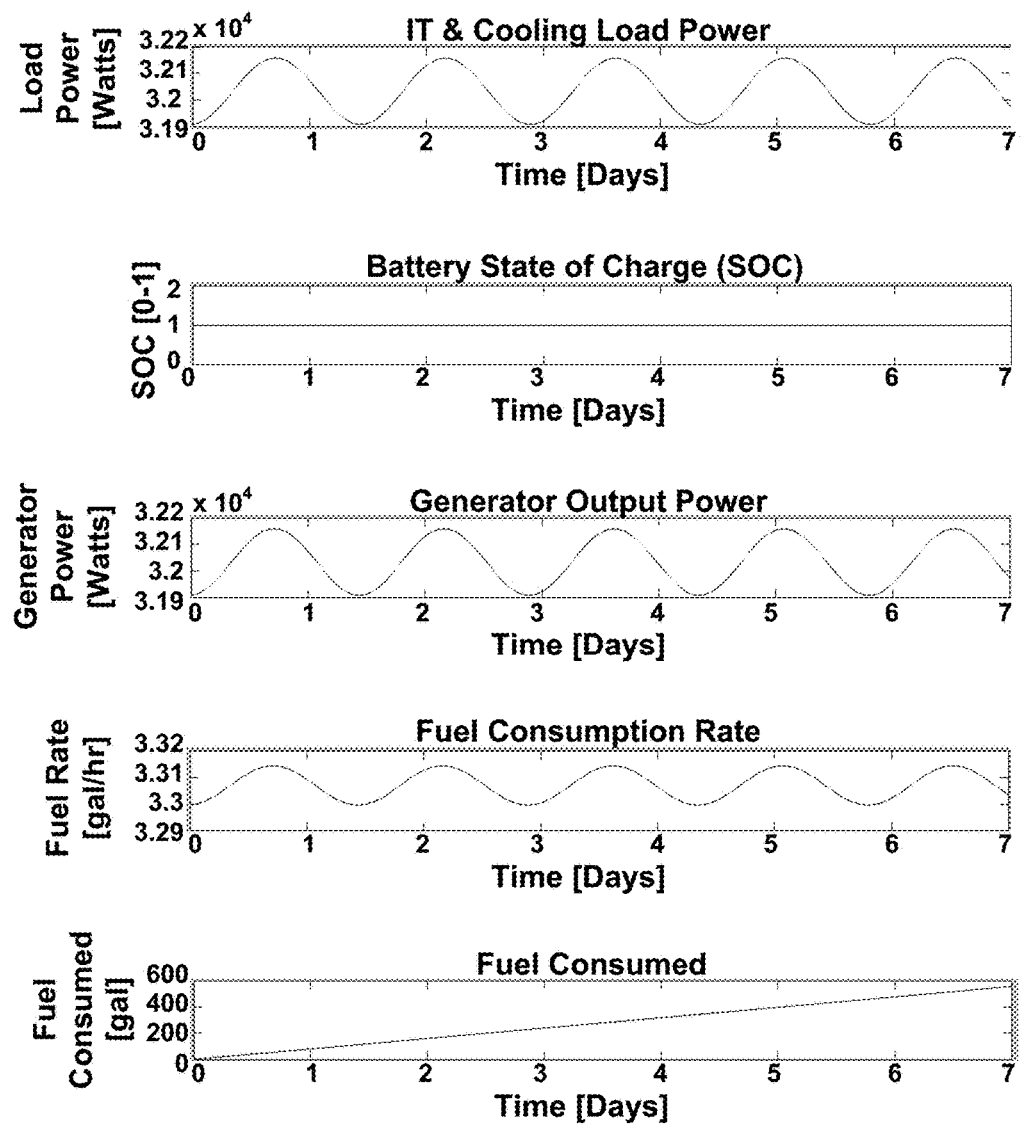
FIGS. 3A-3B are plots of data.
Figure 3B:
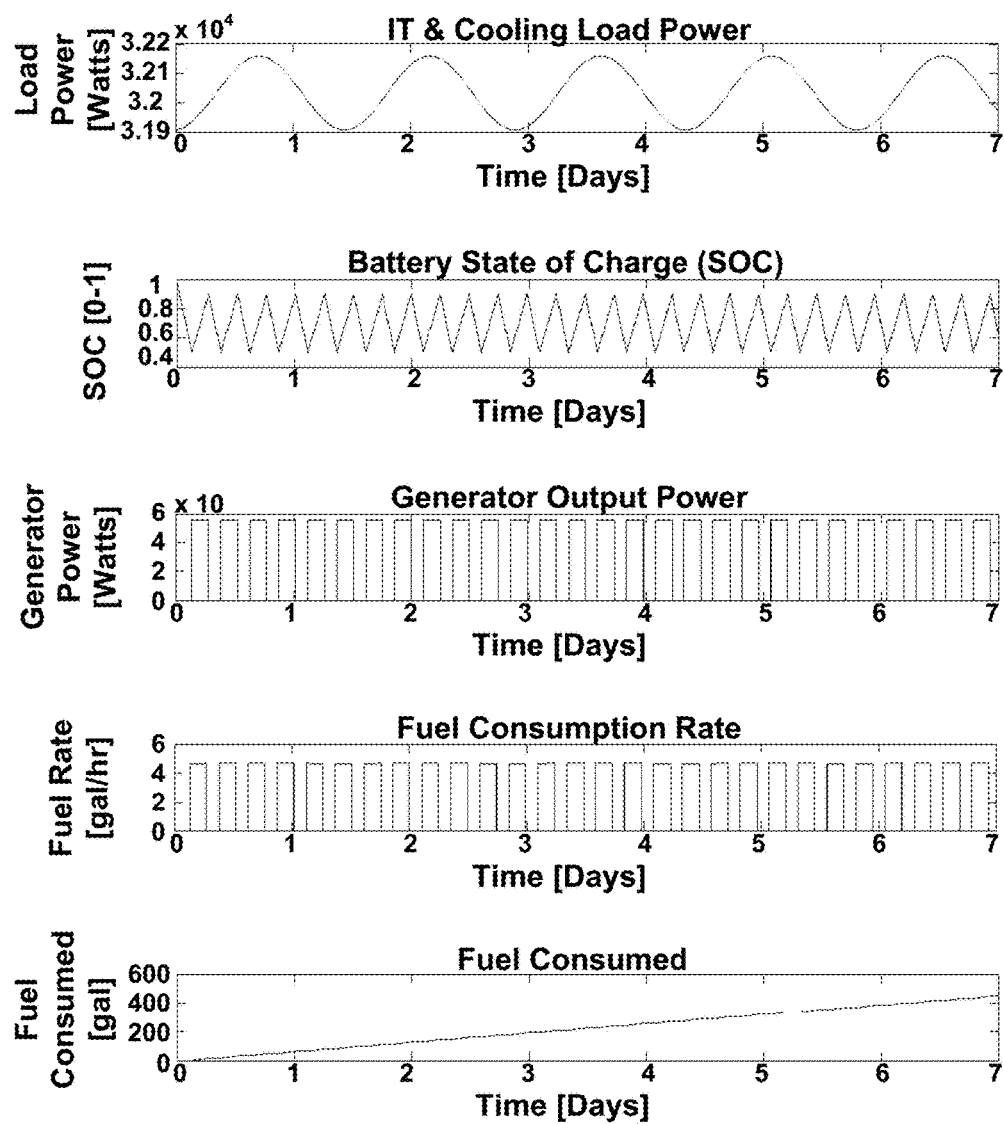
Figure 4:
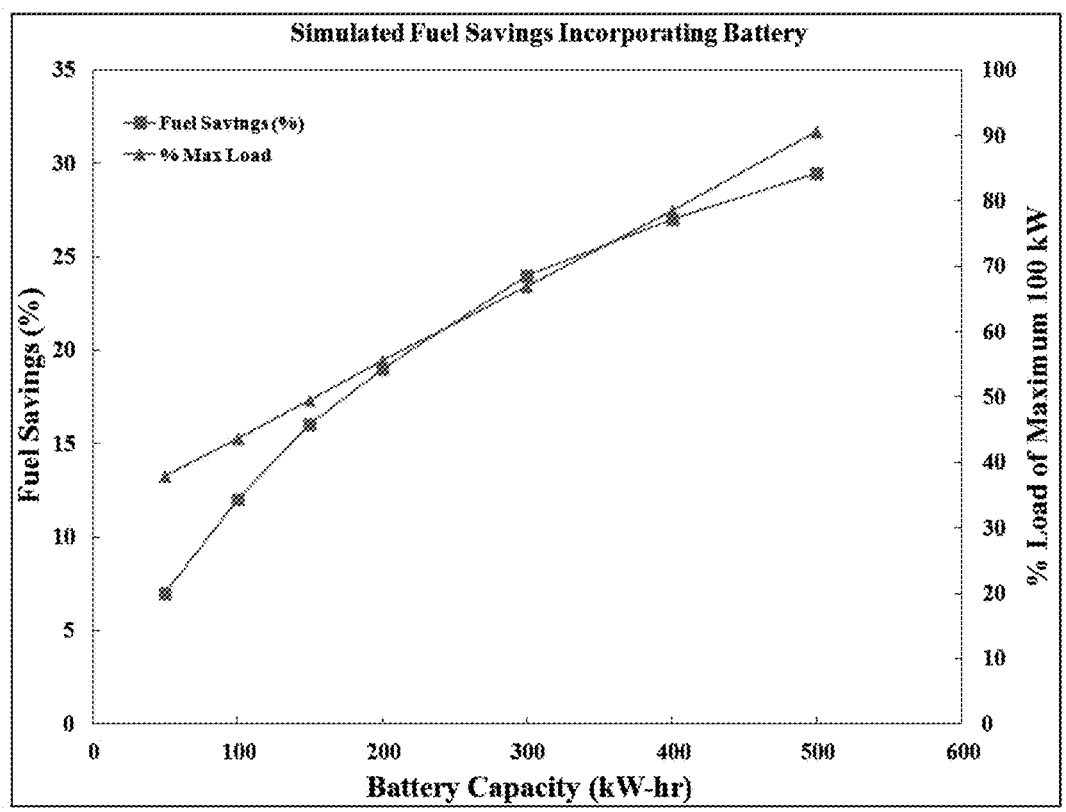
FIG. 4 is a plot of battery capacity versus fuel savings.

FIGS. 3A-3B and 4 are plots illustrating fuel savings. FIG. 3A shows a baseline load power and fuel consumption when the energy storage is not being used (so the generator is always on). FIG. 3B shows a situation where the energy storage is incorporated and the generator can be turned off. FIG. 4 shows that as the energy storage capacity is increased, the overall fuel savings can be increased.

In the IT system coordination method 10, the processor may receive feedback about whether the generator or energy storage is being used, the current ambient air temperature surrounding the IT system, and the size of low priority task queue. When the generator is on (and energy storage is charging), the power generation management scheme sets the IT equipment to be operating at max power, completing as many high and low priority tasks (jobs) as possible. Additionally, when the generator is on, the power generation management scheme, via the processor, sets the A/C system to be cooling the IT equipment at a max rate (max cooling power)—all with the goal of maximizing the load on the generator. In one embodiment, when the system switches to being powered by the energy storage, not only will the energy storage realize these additional savings by operating when the generator is off but it will provide additional savings due to the following reasons: (1) Since the cooling load was maximally turned on—the A/C may have over-cooled the servers (and surrounding area) and therefore may be able to be turned off-keeping the generator off even longer. In this way, the cooled air acts as a natural energy storage system; (2) Since the energy storage source (batteries in this embodiment) have a non-linear discharge capacity—meaning that as the load on the batteries increases, the effective battery capacity decreases—going to a much lower load (i.e., running only high priority tasks with no air conditioning) while the battery is powering the IT system will effectively increase the battery's capacity and its ability to provide power over a longer time-span; (3) The IT equipment can be controlled to switch to only performing 'high priority tasks' or using virtualization schemes such that one piece of equipment could be heavily loaded and another piece of equipment turned off. Again, this serves not only to reduce the load on the battery and keep it on longer, but also takes advantage of the battery non-linear discharge capacity. Running the IT equipment at higher loads also increases the IT equipment efficiency, effectively reducing the power required per operation performed by the processor. This lowers the heat load generated by the servers, resulting in less required cooling while the battery is being used.

Figure 5:
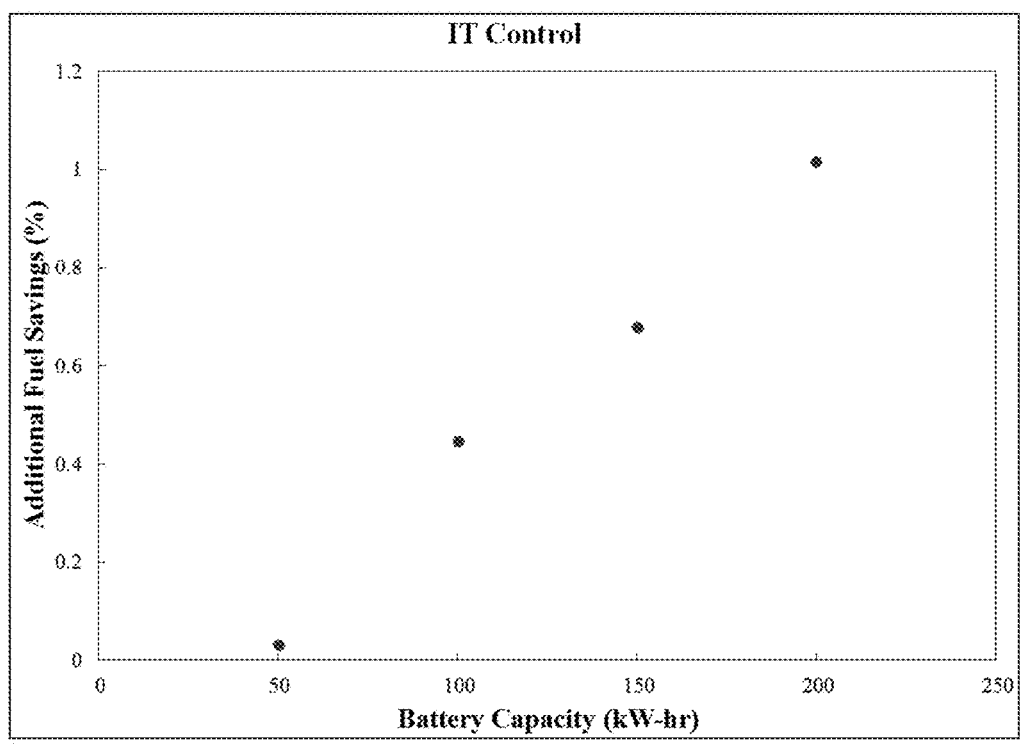
FIG. 5 is a plot of battery capacity versus fuel savings.

FIG. 5 is a plot showing fuel savings versus battery capacity. A basic IT control strategy involving high priority and low priority tasks was modeled and the additional fuel savings are shown FIG. 5. The power generation management scheme of the IT system coordination method 10 is aware of where the supplied power is coming from and works to minimize the load (both power and heat) during battery operation. The power generation management scheme takes input from all of the loads as well as the generator and energy storage source and determines how to most effectively operate the loads as well as the generator/storage system based on the parameters of the control scheme. The power generation management scheme of the IT system coordination method 10 may be used to manage the rate at which the high priority tasks are performed while the IT system is powered by the energy storage source such that the energy storage source achieves at least 80% of its rated ampere-hour capacity according to Peukert's law. Peukert's law may be stated as:

$$It = C\left(\frac{C}{IH}\right)^{k-1}$$

where:
H is the rated discharge time (in hours),
C is the rated capacity at that discharge rate (in ampere-hours),
I is the actual discharge current (in amperes),
k is the Peukert constant (dimensionless), is always ≥1, and increases over time as the battery degrades,
t is the actual time to discharge the battery (in hours), and
It is the effective capacity at the discharge rate I.

The power generation management scheme of the IT system coordination method 10 is a systems-level control architecture that is generic enough to consider different types of electrical energy supply besides just a generator and the energy storage source, but also incorporation of photovoltaics (PV) or other renewable power sources. The power generation management scheme of the IT system coordination method 10 is a systems-level control architecture that may incorporate any specific control methodology that considers all of these systems at once to minimize fuel consumption.

The power generation management scheme may be any management scheme designed to maximize fuel savings even if some IT processing tasks must be delayed. For example, the power generation management scheme of the IT system coordination method 10 may comprise, consist of, or consist essentially of the steps of replenishing the energy in the energy storage source while the generator is running and running the generator only long enough to reach full energy storage capacity of the energy storage source.

An embodiment of the IT system coordination method 10 further comprises the step of driving the ambient air temperature surrounding the IT system down as fast as possible, but not lower than a minimum allowable temperature as set forth in the class 1 standard of the American Society of Heating, Refrigerating and Air-Conditioning Engineers (ASHRAE) with an air conditioner that only runs when the generator is powering the IT system. The processor may then alter the source of power for the IT system from energy-storage-source power to generator power when the ambient air temperature reaches a highest safe operating temperature of the IT system and then switch back to energy-storage-source power once the ambient air temperature drops to a lower threshold temperature. The highest safe operating temperature of the IT system may be defined by ASHRAE standards. The difference between the highest safe operating temperature of the IT system and the lower threshold temperature may be at least 15° Celsius.

Further, the processor may be configured to alter the source of power for the IT system from energy-storage-source power to generator power when a level of stored energy in the energy storage source reaches a lower energy threshold value. While the IT system is running on generator power, the generator may be used to replenish the energy in the energy storage source. The generator may be run only long enough to reach full capacity of the energy storage source before switching back to energy-storage-source power.

The processor may be configured to alter the source of power for the IT system from energy-storage-source power to generator power when the queue of low priority tasks exceeds a first queue-size threshold and then the generator may be run only long enough to reach a desired storage capacity of the energy storage source before switching back to energy-storage-source power. In the case of a virtualized IT system under the control of a hypervisor (such as Hyper-V, VMWare, or Xen), the power generation management scheme of the IT system coordination method 10 may use the hypervisor's native idea of a virtual machine priority to determine which tasks are restricted in the reduced energy availability state. The policy for moving between energy availability states may be based on the level of the remaining energy in the energy storage source. When this energy falls below a fixed minimum level, the processor may power up the generator to move into the high energy availability state, which triggers the HVAC unit to begin over-cooling the system and the hypervisor to allow unrestricted access to computational resources. Once the energy storage system is charged, the generator is powered down, the HVAC system set point returns to a high temperature, and the hypervisor restricts access to computational resources for low-priority tasks. The minimum power level, the high and low HVAC set points, and the specific configuration of priority levels for different virtual machines are application-specific parameters.

Figure 6:
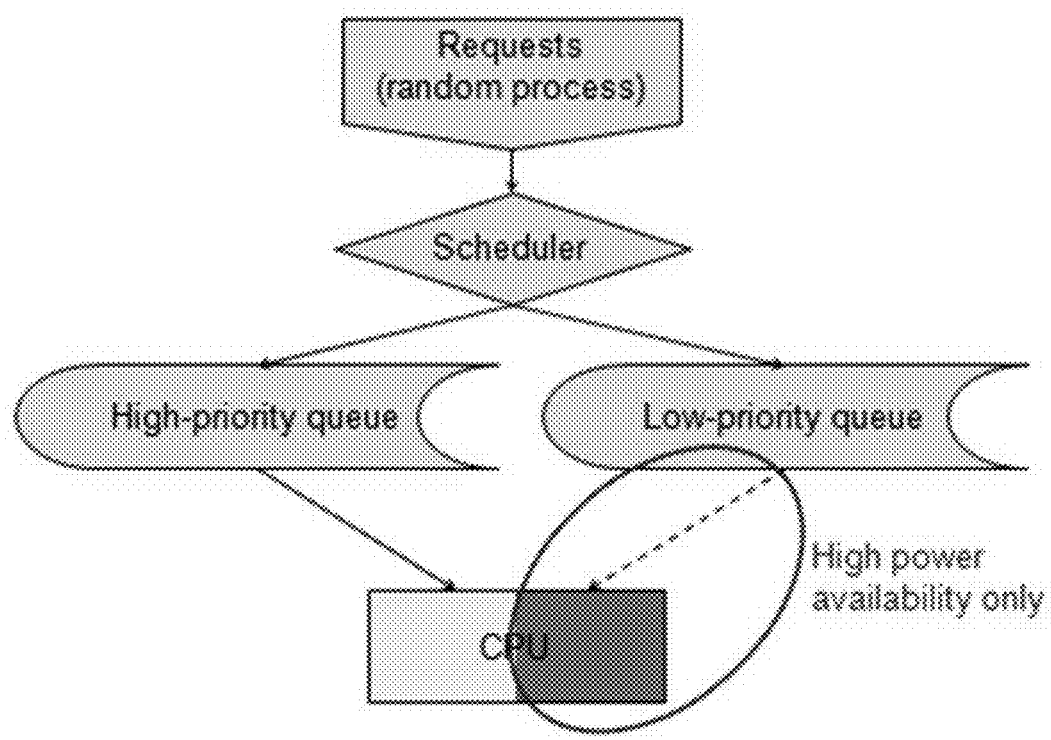
FIG. 6 is a control logic flowchart.

FIG. 6 is an illustration of an embodiment of a task scheduler logic that may be used by the processor when implementing the power generation management scheme of the IT system coordination method 10. The control logic shown in FIG. 6 depends on the source of power that is currently powering the IT system. In other words, the tasks in the low priority queue are only worked when the generator is powering the IT system (i.e, when there is high power availability).

Figure 7:
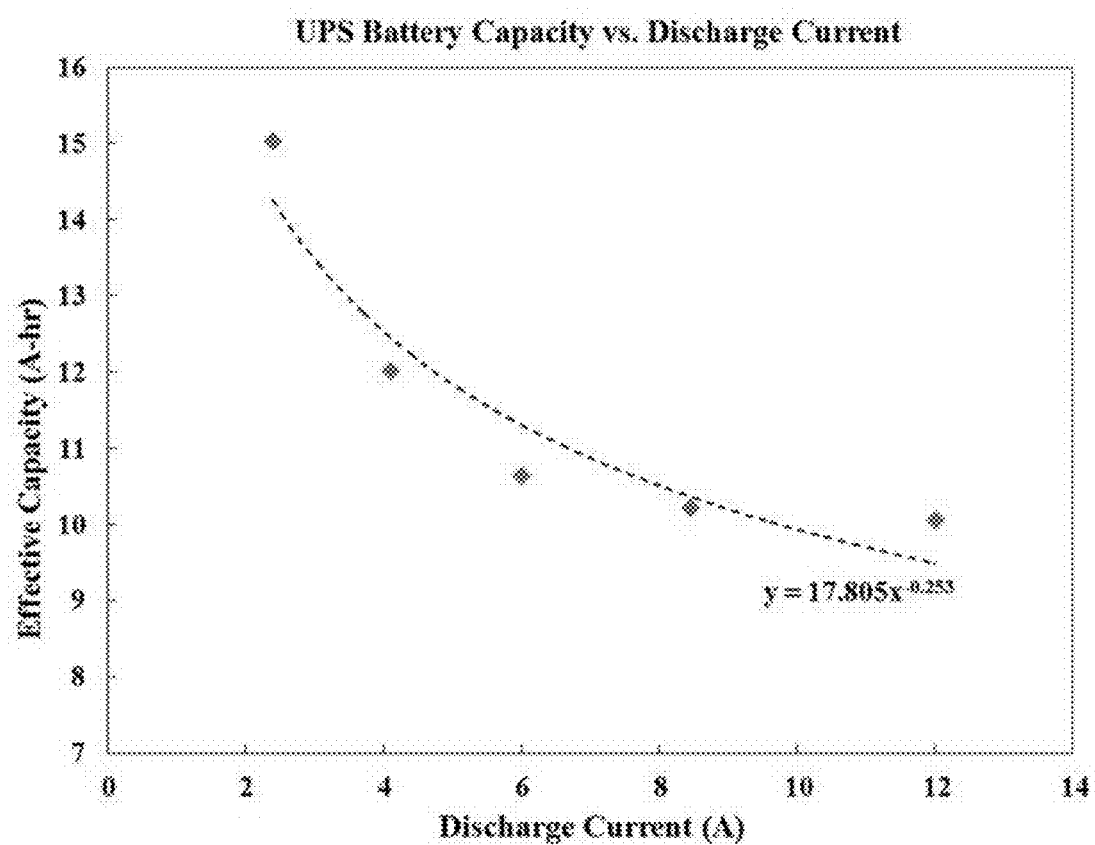
FIG. 7 is a plot of battery capacity versus discharge rate.

FIG. 7 is a plot showing the effective capacity of a battery versus various values of discharge current. As shown in FIG. 7, the effective capacity of the battery is dependent on the load. The lower the discharge current, the higher the effective capacity of the battery. Thus, in an embodiment of the power system where the energy storage source is a battery, as the power generation management scheme of the IT system coordination method 10 holds low priority tasks in abeyance while the IT system is running on power from the battery the battery's effective capacity may be increased as opposed to running all low and high priority tasks at once.

From the above description of the method 10 for coordinating operation of an off-grid, hybrid power system and an information technology (IT) system, it is manifest that various techniques may be used for implementing the concepts of IT system coordination method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that IT system coordination method 10 is not limited to the particular embodiments described herein, but is capable of many embodiments without departing from the scope of the claims.

We claim:
1. A method for coordinating operation of an off-grid, hybrid power system and an information technology (IT) system comprising the following steps:
    powering the IT system with the off-grid, hybrid power system according to a power generation management scheme designed to maximize fuel savings, wherein the hybrid power system comprises a generator and an electrical energy storage source;

monitoring tasks performed by the IT system with a processor;

determining which component of the hybrid power system is currently powering the IT system; and dynamically changing the tasks performed by the IT system depending on which component of the hybrid power system is currently powering the IT system such that the IT system only performs high priority tasks when the energy storage source is powering the IT system and such that a queue of low priority tasks are held in abeyance until the generator is powering the IT system.

2. The method of claim 1, wherein the power generation management scheme comprises replenishing the energy in the energy storage source while the generator is running and running the generator only long enough to reach full energy storage capacity of the energy storage source.

3. The method of claim 1, further comprising the step of driving ambient air temperature surrounding the IT system down as fast as possible, but not lower than a minimum allowable temperature as set forth in the class 1 standard of the American Society of Heating, Refrigerating and Air-Conditioning Engineers (ASHRAE), with an air conditioner that only runs when the generator is powering the IT system.

4. The method of claim 3, further comprising the step of switching from energy-storage-source power to generator power when the ambient air temperature reaches a highest safe operating temperature of the IT system and then switching back to energy-storage-source power once the ambient air temperature drops to a lower threshold temperature.

5. The method of claim 4, wherein the difference between the highest safe operating temperature of the IT system and the lower threshold temperature is at least 15° Celsius.

6. The method of claim 3, further comprising the steps of:
switching from energy-storage-source power to generator power when a level of stored energy in the energy storage source reaches a lower energy threshold value;
replenishing the energy in the energy storage source while the IT system is running on generator power; and
running the generator only long enough to reach full capacity of the energy storage source before switching back to energy-storage-source power.

7. The method of claim 6, further comprising the steps of:
switching from energy-storage-source power to generator power when the queue of low priority tasks exceeds a first queue-size threshold; and then
running the generator only long enough to reach full capacity of the energy storage source before switching back to energy-storage-source power.

8. The method of claim 7, wherein the energy storage source is a bank of batteries.

9. The method of claim 7, wherein the energy storage source is compressed gas.

10. The method of claim 2, wherein the power generation management scheme further comprises managing the rate at which the high priority tasks are performed while the IT system is powered by the energy storage source such that the energy storage source achieves at least 80% of its rated ampere-hour capacity according to Peukert's law.

11. A method for coordinating operation of an off-grid, hybrid power system and an information technology (IT) system comprising the following steps:
identifying tasks performed by the IT system as either low priority tasks or high priority tasks with a processor;
powering the IT system with the off-grid, hybrid power system which comprises a generator and an energy storage source, wherein the generator is turned on only if one or more of the following conditions exist:
ambient air temperature surrounding the IT system reaches a highest safe operating temperature of the IT system,
a level of stored energy in the energy storage source reaches a lower threshold value, and
a queue of low priority tasks exceeds a first queue-size threshold;
driving the ambient air temperature surrounding the IT system down with an air conditioner as fast as the air conditioner will allow while the generator is running;
charging the energy storage source while the generator is running;
performing the low priority tasks in addition to the high priority tasks while the generator is running;
performing only high priority tasks and holding in abeyance low priority tasks while the generator is not running;
if the generator is running, turning off the generator and powering the IT system with energy-storage-source power if all of the following conditions are satisfied:
the ambient air temperature is less than or equal to a lower threshold temperature,
the energy storage source has reached a desired energy storage capacity, and
the queue of low priority tasks is below a second queue-size threshold.

12. The method of claim 11, wherein the difference between the highest safe operating temperature of the IT system and the lower threshold temperature is at least 15° Celsius.

13. The method of claim 11, further comprising shutting off the air conditioner even if the generator is still running if the ambient air temperature reaches a minimum allowable temperature as set forth in the class 1 standard of the American Society of Heating, Refrigerating and Air-Conditioning Engineers (ASHRAE).

14. The method of claim 12, wherein the desired energy storage capacity is about 100% full.

15. The method of claim 11, further comprising the step of managing the rate at which the high priority tasks are performed while the IT system is powered by the energy storage source such that the energy storage source achieves at least 80% of its rated ampere-hour capacity according to Peukert's law.

16. The method of claim 11, wherein the off-grid, hybrid power system further comprises a photovoltaic (PV) cell configured to charge the energy storage source and to provide power to the IT system.

17. The method of claim 16, wherein the energy storage source is a bank of batteries.

18. The method of claim 16, wherein the energy storage source is compressed gas.

* * * * *